United States Patent [19]

Brugger et al.

[11] Patent Number: 5,499,866
[45] Date of Patent: Mar. 19, 1996

[54] MONITORING METHOD AND DEVICE IN AUTOMATIC BRAKING PROCESS

[75] Inventors: Manfred F. Brugger, Winnenden; Martin Klarer, Kernen; Bernd Knoff, Esslingen; Albrecht Eckl, Stuttgart; Manfred Steiner, Winnenden; Siegfried Rump, Weinstadt; Joachim Nell, Ostfildern; Fredy Eckstein, Winnenden; Christoph Steffi, Backnang; Brian Douglas, Stuttgart, all of Germany

[73] Assignee: Mercedes-Benz AG, Germany

[21] Appl. No.: 337,426

[22] Filed: Nov. 8, 1994

[30] Foreign Application Priority Data

Nov. 8, 1993 [DE] Germany ............... 43 38 064.6

[51] Int. Cl.⁶ .................... B60T 7/12; B60T 17/22
[52] U.S. Cl. ............. 303/122.08; 303/20; 303/122.11
[58] Field of Search .................... 303/20, 92, 113.4, 303/119.1, 94, 103, 122.05, 122.08, 122.11

[56] References Cited

U.S. PATENT DOCUMENTS 5,176,429  1/1993  Junichi et al. ............... 303/20 X
5,199,770  1/1993  Yoshino et al. ............... 303/113.4 X
5,413,404  5/1995  Inagawa ......................... 303/92

FOREIGN PATENT DOCUMENTS

4208496C1  8/1993  Germany .
4243648    8/1992  Japan ........................ 303/20
6064526    3/1994  Japan ........................ 303/92

Primary Examiner—Josie Ballato
Attorney, Agent, or Firm—Evenson, McKeown, Edwards & Lenahan

[57] ABSTRACT

A device monitors an automatic braking process by using a fault-detecting, operational testing method which takes place via an automatic braking process lasting only briefly, typically about 50 ms. The method is initiated by a test control device and can take place during different vehicle states. If, for example, current through a solenoid valve does not lie within specific acceptable limit values or pedal travel which results from the actuation is not determined at the brake pedal, the device concludes that an operational fault has occurred

22 Claims, 4 Drawing Sheets

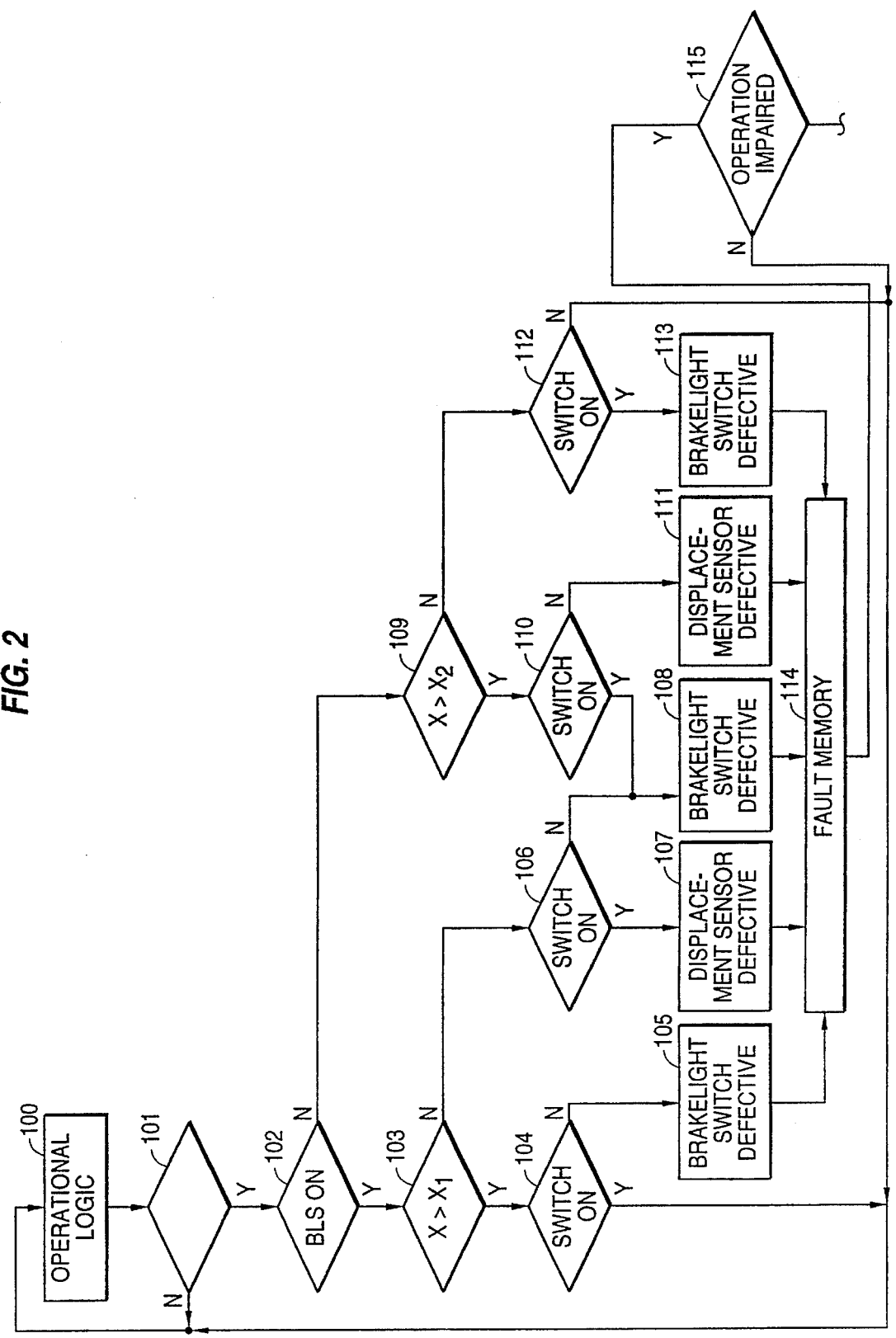

MONITORING METHOD AND DEVICE IN AUTOMATIC BRAKING PROCESS

BACKGROUND AND SUMMARY OF THE INVENTION

The present invention relates to a method for monitoring the operation of a device for carrying out an automatic braking process and to the device for carrying out an automatic braking process comprising a solenoid valve actuator carrying out an automatic braking process, a switch for terminating the automatic braking process under specific switching conditions, a displacement sensor for detecting travel of a brake pedal, a control device for controlling the automatic braking process and a test control device.

DE 42 08 496 C1 shows a partial-vacuum brake booster which has a solenoid valve for venting the pedal-side chamber in order to produce a higher brake pressure than results from the position of the brake pedal. Arranged on the brake pedal is, on one hand, a displacement sensor which detects the position of the brake pedal and, on the other hand, a switch which is actuated at least when the brake is released by the driver.

In this known device, the presence of operational faults of the device for carrying out an automatic braking process is not monitored. As a result, faults may occur which prevent automatic braking processes from being carried out in an operationally reliable way.

An object of the present invention is to provide a monitoring method for an automatic braking device to detect faults which could prevent an automatic braking process from being reliably carried out.

This object has been achieved according to the present invention by providing a method in which monitoring takes place by way of a test control device with a brief actuating of the solenoid valve by the test control device taking place under prescribed vehicle states, determining at least whether switching current of the solenoid actuator valve lies within prescribed limit values and via the displacement sensor, whether a pedal travel has occurred which corresponds to the pedal travel caused by the automatic braking process as criteria as to whether or not an operational fault of the automatic braking process has occurred, and if the determined criteria are not fulfilled the presence of an operational fault in the device for carrying out an automatic braking process is detected and appropriate intervention in the automatic braking process occurs.

The operational testing takes place by an automatic braking process which only lasts briefly and is not triggered by the control device of the automatic braking process but rather by a test control device. "Brief actuation" is used here in the sense of an actuation about a few tenths of a second, preferably only in the order of magnitude of approximately 50 ms. The actuation can take place during different travel states which are specified in the test control device. If it is detected here that the current through the solenoid valve is not within prescribed limit values or that a pedal travel which results from the actuation is not determined at the brake pedal, the presence of an operational fault of the device is concluded.

The actuation of the solenoid valve by the test control device can be carried out when the ignition of the vehicle is switched on, after the engine starts up and when the brake pedal is not being actuated for the first time after starting up. In addition, in the case of an operational fault the execution of an automatic braking process is prevented and the driver is informed of this via a display. Furthermore, other criteria are also presented which are used to test the operation of the device for carrying out an automatic braking process.

BRIEF DESCRIPTION OF THE DRAWINGS

These and other objects, features and advantages of the present invention will become more readily apparent from the following detailed description thereof when taken in conjunction with the accompanying drawings wherein:

FIG. 2 is a flow diagram of a method for monitoring the operation of the device at the start of a journey.

DETAILED DESCRIPTION OF THE DRAWINGS

Figure 1:
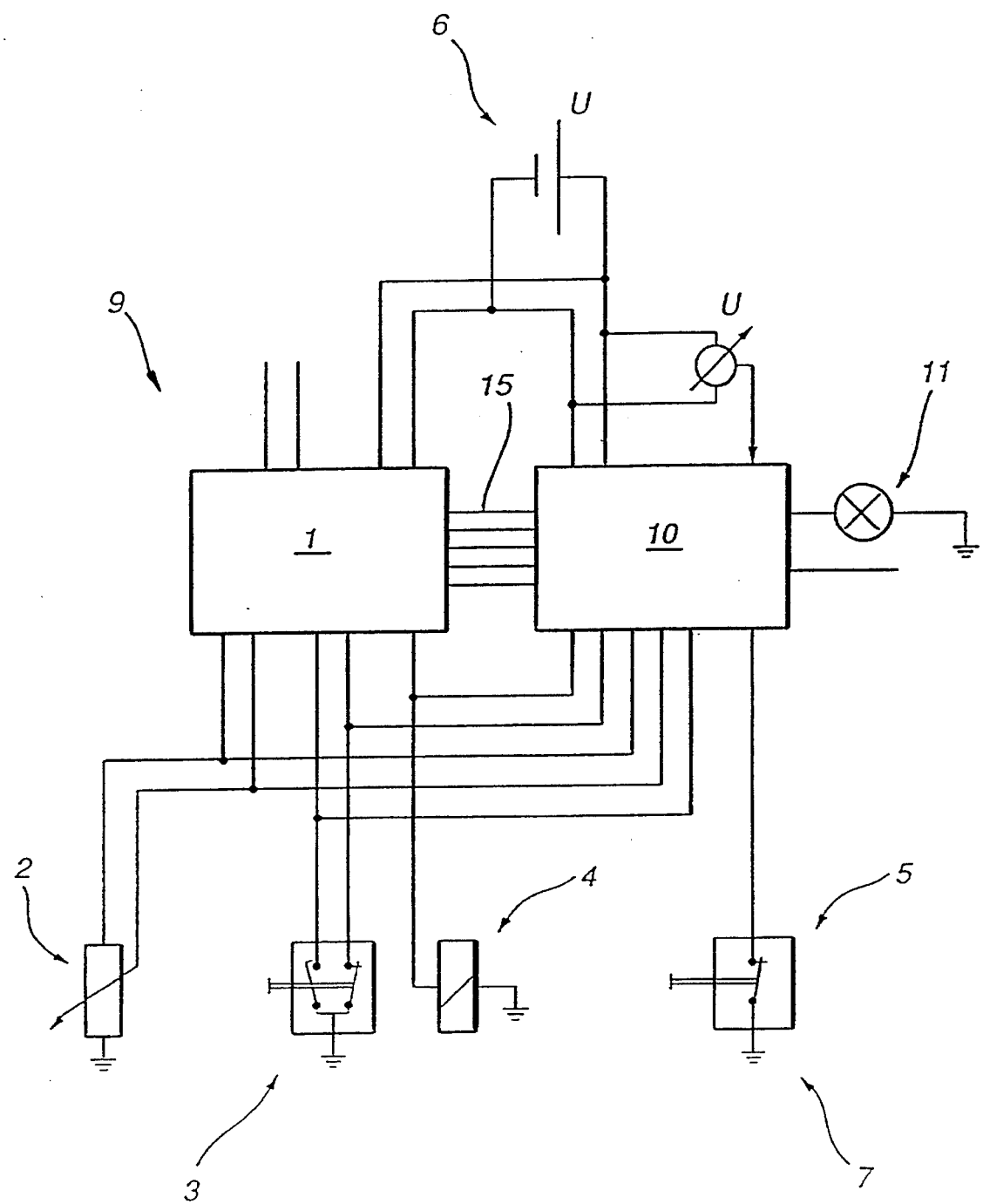
FIG. 1 is a schematic diagram of a device for carrying out an automatic braking process and a test control device connected thereto in accordance with the present invention.

FIG. 1 shows the test control device 10 and a device for carrying out an automatic braking process which comprises a control device 1 separate from the test control device 10 which, like the test control device, is supplied from the voltage source 6, usually the voltage of the vehicle electrical system. The test control device 10 is connected to the control device 1 via the data lines 15. The control device 1 has an input for a data line 9 which for example permits the control device 1 to be connected to a databus in the vehicle or to a diagnostic device.

A displacement sensor designated generally by the numeral 2 of the brake pedal has a switch 3 of double configuration (double throw/double pole) in this embodiment and a solenoid valve 4 which are also connected to the control device 1. The lines leading from these components to the control device 1 each have a branch leading to the test control device 10.

Furthermore, the brake light switch 5 is connected to the test control device 10. The brake light switch 5 is a single switch (single throw/single pole) because its operation can be monitored via the signals of the displacement sensor 2. It is, therefore, not necessary to make the brake light switch 5 of a double configuration, in contrast with switch 3, even when using other control devices in the vehicle which are critical for safety and dependent on the switched position of the switch 5. In addition, the display 11, e.g. as lamp, is also connected to the test control device 10 to indicate to the driver the occurrence of an operational fault which is detected by the test control device 10.

Figure 1A:
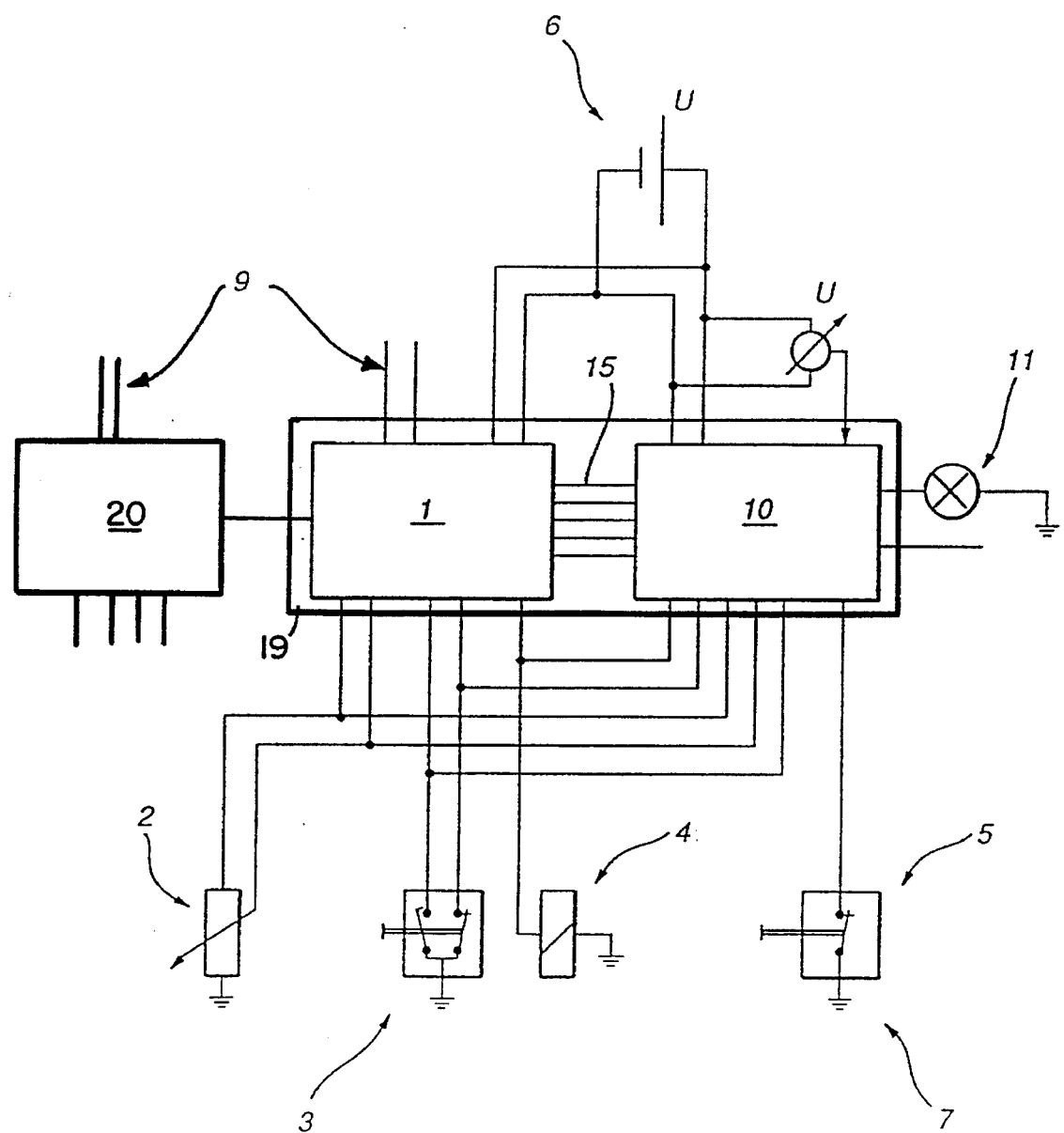
FIG. 1a is a schematic diagram of a device similar in operation to that of FIG. 1 but in which a single unit contains the test control device and the control device, and an anti-lock brake system is connected to the single unit.

FIG. 1a shows another embodiment in which the test control device 10 and the control device 1 form a single unit 19 connected with a conventional anti-lock brake control system 20.

FIG. 2 is a flow diagram which illustrates testing of the device for carrying out an automatic braking process. It is assumed here that the switch 3 which causes the automatic braking process to be switched off is moved out of a rest position into its switched position during the actuation of the brake pedal and remains in this position until the brake pedal is moved in the direction of its position of rest. According to other embodiments of the switch 3 which are within the contemplation of the present invention, the switching process which causes the automatic braking process to be broken off may also be dependant on the pedal force which the driver applies. Therefore, the switch 3 can be other than a pure displacement sensor, such as the brake light switch 5, because the switch 3 also switches back into the rest position when the brake pedal is not moved back completely into its rest position.

Step 100 represents the operational logic of the automatic braking process, where the fulfillment of triggering and breaking-off criteria is tested and the execution of the automatic braking process is controlled. In step 101, the system is interrogated as to whether an automatic braking process is carried out. If the process has not been carried out, the system jumps back immediately to step 100, and testing of the operation of the elements therefore does not take place. As a result, the automatic braking process is prevented from being broken off prematurely when the present automatic braking process is being carried out and an operational fault occurs during that process.

In step 102 it is investigated whether the brake light switch 5 is actuated. If the switch 5 is activated and if in step 103 it is detected that the signal of the displacement sensor represents a pedal travel X which exceeds the pedal travel threshold value X1, it is tested in step 104 whether the switch 3 is actuated or not. Here, the switch 3 can be of the aforementioned double configuration and actuation of the switch is only concluded if both switching elements of the switch are actuated. Correct operation is concluded when the switch 3 is actuated. The jump back to step 100 then takes place. If it has been detected in step 104 that the switch is not actuated, the presence of a defective switch 3 is then concluded in step 105. The fault is then stored in the fault memory according to step 114.

The state of the fault memory is tested in step 115. If, because of its state, a fault which impairs the reliability of the automatic braking process is detected, the automatic braking process is switched off. Otherwise, the system jumps back to step 100. Testing of the fault memory according to step 115 takes place here after each new entry in step 114.

If, however, it has been detected in step 103 that the pedal travel X does not exceed the pedal travel threshold value X1 whose value lies at a pedal travel of a few millimeters, in particular at approximately 5 mm, the switched state of the switch 3 is tested in step 106. If the switch 3 is actuated, according to step 107 the presence of a fault of the displacement sensor 2 is concluded. If the switch 3 is not actuated, then in step 108 the presence of a defect of the brake light switch 5 is concluded. In both cases, in step 114 an appropriate entry is made in the fault memory.

If, on the other hand, in step 102 an actuation of the brake light switch 5 has not been detected, in step 109 the pedal travel X is compared with a pedal travel threshold value X2. This pedal travel threshold value X2 can have here the same value as the pedal travel threshold value X1. If it is detected in step 109 that the pedal travel threshold value X2 has been exceeded, it is tested in step 110 whether the switch 3 is actuated or not. If the switch 3 has been actuated, the system jumps back to step 108. Otherwise, in step 111 the presence of a defective displacement sensor 2 is concluded, and the system jumps then to step 114.

If it has not been detected in step 109 that the pedal travel threshold value X2 has been exceeded, then in step 112 the switch 3 is tested. If the switch 3 is actuated, according to step 113 the presence of a defective switch 3 is concluded and the system jumps to step 114. Otherwise, all the tested elements are operative and the system jumps back to step 100.

As above described, operational fault is detected based upon the determination of certain criteria which includes testing as to whether the pedal travel determined by the displacement sensor lies within an interval formed by a lower pedal travel limit value X1 and an upper pedal travel limit value X2. Alternatively, the system can test whether a pedal speed value which is fed to the test control device 10 exceeds a threshold value, or in lieu of determining the switching current, the voltage at the terminals of the solenoid valve actuation 4 can be measured.

In addition, the supply voltage U of the control device 10 can be monitored. The system deems an operational fault to occur when the supply voltage U is outside a prescribed operating voltage interval and to be terminated what the supply voltage U is within a switch-on interval which is narrower than the operating voltage interval.

The flow diagram described here represents testing of the operation elements, during the "normal" braking operations in which automatic braking is not taking place. Since these normal braking operations are the overwhelming majority of braking operations which take place continuously, continuous testing of the operational elements of the automatic braking process is ensured.

Figure 3:
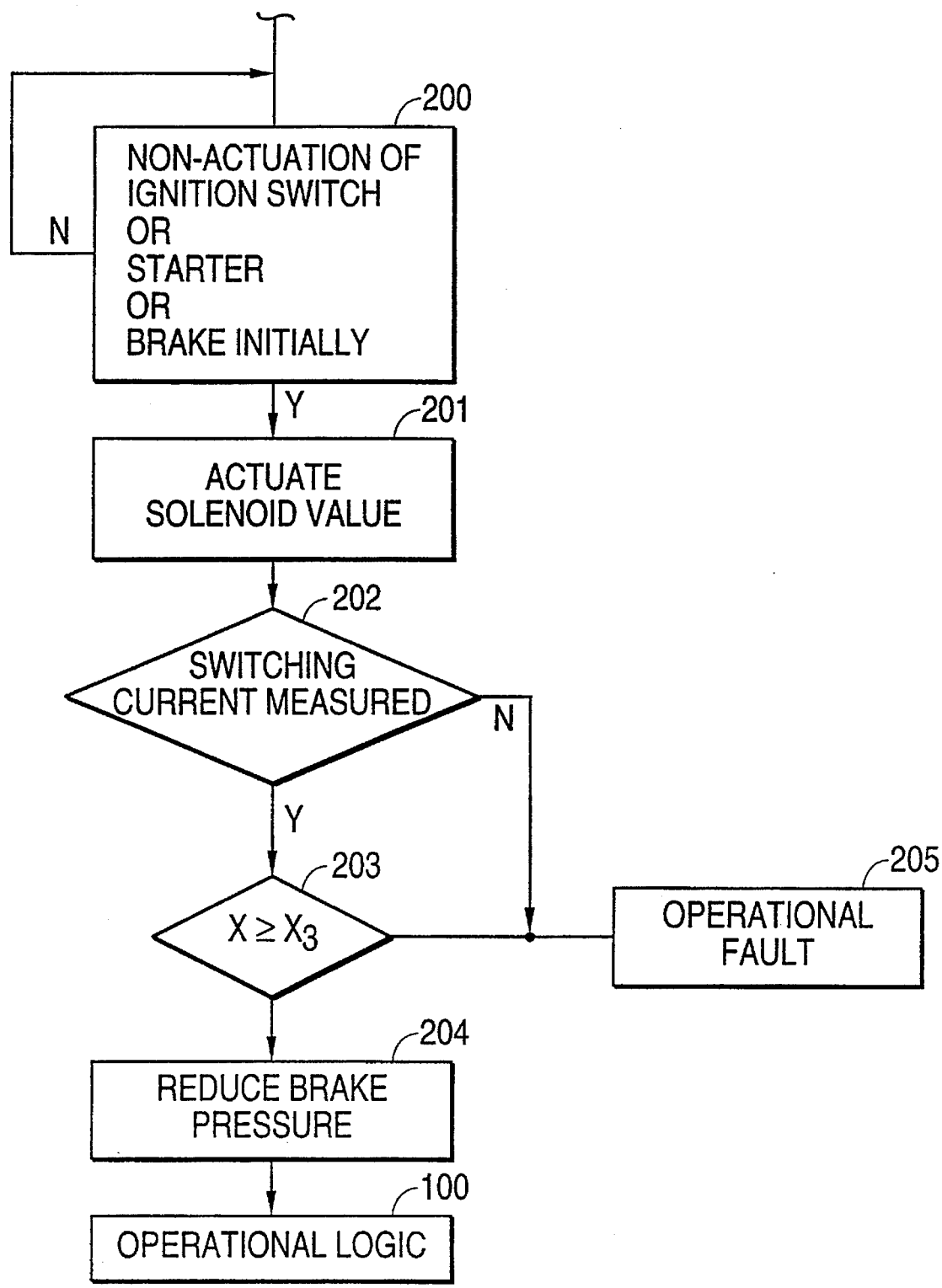
FIG. 3 is a flow diagram of a method for monitoring the operation of the device at the start of a journey.

FIG. 3 shows the flow diagram of a method for monitoring the operation of the device at the start of a journey. In step 200, it is tested whether the ignition switch has been switched on, whether the starter has been actuated or whether the brake is initially unactuated after starting up. If one of these criteria is fulfilled, the system jumps to step 201, otherwise the interrogation is renewed.

In step 201, the solenoid valve 4 is briefly actuated, that is to say for up to 500 ms, preferably, however, only for 50 ms to 200 ms, by the test control device 10. The switching current of the solenoid valve is measured according to step 202. If it is within the acceptable limit values, which are for example stored in the control test device 10 or in the control device 1, in step 203 it is measured whether the pedal travel X exceeds a pedal travel threshold value X3. The acceptable limit values are determined by the operating range of the switching currents of the solenoid valve 4. If this is also the case, correct operation of the device for carrying out the automatic braking process is concluded and according to step 204 the brake pressure is reduced. Then, for example if all the three criteria of step 200 have not yet been fulfilled, a jump back to step 200 may occur or else a jump to step 100 (FIG. 1) as illustrated in FIG. 3.

If one of the two criteria of steps 202 and 203 has not been fulfilled, a jump to step 205 takes place. It is indicated to the driver that an operational fault of the automatic braking process has occurred. Execution of the automatic braking process can be prevented. An automatic braking process which may be present is either carried out completely or broken off. In the event that the automatic braking process is broken off, the additional brake pressure which has been built up is thus reduced again as would be the case when the normal breaking-off criteria is fulfilled.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for monitoring operation of an automatic braking process device comprising a solenoid valve actuator carrying out an automatic braking process, a switch for terminating the automatic braking process under specific switching conditions, a displacement sensor for detecting travel of a brake pedal, a control device for controlling the automatic braking process and a test control device, wherein the method comprises the steps of (a) brief actuating of the solenoid valve by the test control device taking place under prescribed vehicle states, (b) determining criteria comprising at least whether switching current of the solenoid actuator valve lies within prescribed limit values and whether a pedal travel has occurred, via the displacement sensor, corresponding to the pedal travel caused by the automatic braking process as criteria as to whether or not an operational fault of the automatic braking process has occurred, and (c) if the determined criteria are not fulfilled, determining the presence of an operational fault in the automatic braking process device and causing intervention in the automatic braking process.

2. The method according to claim 1, wherein the actuation of the solenoid valve actuator by the test control device takes place when at least one of the following occurs:

(d) when the ignition of the vehicle is switched on, (e) after the starting of the engine, (f) if the brake pedal is initially not being actuated after the starting of the engine.

3. The method according to claim 1, wherein the step of determining criteria includes testing as to whether the pedal travel caused by the automatic braking process exceeds a pedal travel threshold value.

4. The method according to claim 1, wherein the step of determining criteria includes testing as to whether the pedal travel determined by the displacement sensor lies within an interval formed by a lower pedal travel limit value and by an upper pedal travel limit value.

5. The method according to claim 1, wherein the step of determining criteria includes testing as to whether the pedal travel of a present measurement corresponds to a previously measured pedal travel.

6. The method according to claim 5, wherein the step of determining criteria includes testing as to whether the pedal travel determined by the displacement sensor lies within an interval formed by a lower pedal travel limit value and by an upper pedal travel limit value.

7. The method according to claim 1, wherein the step of determining criteria includes testing as to whether a value, fed to the test control device, for pedal speed exceeds a pedal speed threshold value.

8. The method according to claim 7, wherein value for the pedal speed is determined from the pedal travel in the control device.

9. The method according to claim 7, further comprising the step of detecting in a fault counter that the pedal speed threshold value has been exceeded and thereby detecting an operational fault as a function of the state of the fault counter.

10. The method according to claim 1, further comprising the steps of feeding a signal of a brake light switch to the test control device, and testing whether the brake light switch is actuated when the pedal travel exceeds a first switching limit value and whether the brake light switch is unactuated when the pedal travel drops below a second switching limit value.

11. The method according to claim 10, wherein the brake light switch is configured as a simple switch.

12. The method according to claim 1, further comprising feeding a signal of a brake light switch to the test control device, and testing, as a function of the signal of the brake light switch, the switching position of the switch for terminating the automatic braking process.

13. The method according to claim 1, wherein the step of determining includes testing as to whether the duration of the actuation of the solenoid valve actuator exceeds a threshold value.

14. The method according to claim 1, wherein the step of determining includes testing voltage at the terminals of the solenoid valve actuator.

15. The method according to claim 1, further comprising the steps of monitoring supply voltage of the control device, detecting an operational fault when the supply voltage is outside a prescribed operating voltage interval, and determining that the operational fault is terminated when the supply voltage again lies within a switch-on interval which is a narrower interval than the operating voltage interval.

16. The method according to claim 1, wherein, when the operational fault is present, a display informs the driver, and execution of the automatic braking process is then prevented.

17. The method according to claim 16, wherein, when the operational fault is present during the automatic braking process, the automatic braking process is terminated before the operational fault is displayed and the execution of the automatic braking process is prevented.

18. The method according to claim 1, wherein the test control device and the control device are separate devices which are operationally independent of one another but physically directly adjacent each other.

19. The method according to claim 1, wherein the test control device and the control device constitute a single unit.

20. The method according to claim 1, wherein, in the event of an operational fault of an anti-lock brake system in a vehicle brake system, the execution of the automatic braking process is prevented above a specific vehicle speed.

21. The method according to claim 20, wherein the vehicle speed is 40 km/h.

22. The method according to claim 1, wherein a circuit of the solenoid valve actuator is only closed when the brake light switch is actuated.

\* \* \* \* \*